UNITED STATES PATENT OFFICE.

W. W. HUSE, OF BROOKLYN, NEW YORK.

IMPROVED PROCESS FOR CURING TOBACCO.

Specification forming part of Letters Patent No. 48,689, dated July 11, 1865.

*To all whom it may concern:*

Be it known that I, W. W. HUSE, of Brooklyn, Kings county, and State of New York, have invented a new and useful Improvement in the Process of Curing Tobacco; and I do hereby declare that the following is a full, clear, and exact description thereof.

It is well known that the commercial value of tobacco depends upon the proper development of nicotine, which is effected by fermentation.

The process of treatment heretofore practiced is very imperfect and occasions serious loss to the planter and to the manufacturer.

Tobacco passes through four changes in fermentation—viz., the saccharine, the vinous, the ascetic, and the putrid—all of which depend upon heat and moisture, and in the presence of these elements it will pass in succession from the one to the other of these four changes. If permitted to pass to the third—the ascetic—it becomes commercially valueless, and by the fourth it is entirely destroyed. Nicotine is evolved by the second change—the vinous—and the proper period for arresting the progress of changes is when ammonia is evolved, and if fermentation be not then arrested it passes to the third stage, and its commercial value is thereby seriously reduced, if not wholly destroyed.

By the process of curing heretofore universally practiced the crop, when gathered in the fall, is hung in the barn to desiccate, and then it is packed in hogsheads or cases, and the fermentation takes place in June, July, and August of the following year. The fermentation begins in the center of the packed mass and proceeds outward. If there be too much moisture in the atmosphere, vinous fermentation will set in, and if, in addition to this, the heat becomes too great, putrid fermentation will supervene. As this process depends upon natural causes which cannot be controlled by human precaution, it follows that serious losses are frequently sustained, and under the most favorable circumstances the planter cannot send his crop to market much short of one year from the time of its being gathered. As the curing takes place in the package, it is seldom, if ever, uniform, the inside being overcured and the outside not sufficiently so. Upon an average, one-fourth part of the tobacco brought to market is marked by the inspector "heated," the market price being thereby seriously reduced.

The object of my invention is to avoid the evil consequences of the process heretofore practiced.

With a view to expedite the curing of tobacco in a comparatively short time, it was attempted many years ago to induce the required fermentation by exposing the tobacco to the action of steam to supply both heat and moisture; but the attempt utterly failed. The fermentation induced could not be arrested at the proper stage, but proceeded to the ascetic and to the putrid stage, and the effort was abandoned as a failure. I have, however, discovered that if steam be properly applied with other heat (for steam alone will give too much moisture) it will rapidly induce the saccharine and then the vinous fermentation, and that so soon as nicotine is evolved, which is determined by the presence of ammonia, if the packages be quickly opened and the tobacco thoroughly and quickly dried by exposure to the drying influence of atmospheric air, the further progress of fermentation will be arrested and the tobacco thoroughly cured. And although I have herein described the application of artificial heat by the circulation of steam through pipes, I have done so simply because it is a more ready mode, in view of the fact that it is necessary to apply the required moisture in the form of steam, as I have found by experiment that steam does not injure the flavor of tobacco; but it will be obvious that the required degree of artificial heat can be applied in any other way, provided it be not applied so as to neutralize the moistening effect of the steam.

I take the tobacco, by preference, after it has been desiccated and packed in the usual manner in hogsheads or cases, and which it is well known are not by any means so close as to exclude steam. I place these hogsheads or cases, or both, in a chamber of convenient size and which can be closed up steam-tight, and I then introduce heat and moisture by means of steam apparatus such as generally employed for heating buildings, the coils or congeries of pipes being arranged in any suitable manner for a proper distribution of the heat. Some of the pipes—about one-half of them—are to be pierced with very small holes to permit the escape of steam into the chamber. It will be found best to raise and maintain the temperature at about 150° Fahrenheit and for about forty-eight hours for tobacco which has been well desiccated, a longer time being required when treated before it has been well dried. At the end of the time specified the tobacco should be examined, and so soon as nicotine is well developed, which will be indicated by the evolution of ammonia, the steam must be shut off, the chamber opened, the hogsheads or cases opened, the tobacco all opened and shaken and thoroughly dried, which is best done in an open and well-ventilated room; and after it has been well dried the tobacco will be found to be thoroughly cured and ready for use, and further fermentation so completely stopped that it can be repacked and kept for any desired length of time. In this way I avoid all the evil consequences of the method heretofore practiced, while at the same time it will enable the planter to put his crop of tobacco in market in a comparatively short space of time.

What I claim as my invention, and desire to secure by Letters Patent, is—

The process, substantially as herein described, of curing tobacco, which process consists in subjecting it to the action of artificial heat and steam to induce the required fermentation until nicotine is evolved, and then stopping the further progress of fermentation by opening the packages and thoroughly drying every part, substantially as described.

WILLIAM W. HUSE.

Witnesses:
WM. H. BISHOP,
ANDREW DE LACY